United States Patent Office 3,634,283
Patented Jan. 11, 1972

3,634,283
SMOKE GENERATING COMPOSITIONS AND
METHODS OF USE
Alexander G. Rozner, Bethesda, and Horace H. Helms,
Jr., Silver Spring, Md., assignors to the United States
of America as represented by the Secretary of the Navy
No Drawing. Filed Nov. 5, 1968, Ser. No. 773,658
Int. Cl. C09k 3/30
U.S. Cl. 252—305  6 Claims

ABSTRACT OF THE DISCLOSURE

Heat initiated smoke-generating compositions comprising zinc powder and Teflon (polytetrafluoroethylene) powder and methods employing these compositions.

BACKGROUND OF THE INVENTION

This invention generally relates to pyrotechnic compositions and more particularly to smoke-generating compositions.

Many types of smoke-generating compositions have been employed in the past and are characterized by certain advantages and disadvantages depending upon the importance of such factors as mobility of the smoke producing apparatus, total obscuring power of the composition and logistical considerations such as storage and handling stability.

Among the most widely employed smoke-generating compositions for military and other uses are the volatile hygroscopic chloride (HC) mixtures, which result in the production of zinc chloride smokes, and the white phosphorus compositions. However, many of the (HC) smoke mixtures are very difficult to handle and require stabilizing agents, while others are highly corrosive towards firing mechanisms and thereby materially limit the storage life of the compositions. The white phosphorus smoke-generating compositions which have been extensively employed in the past are very unstable in air and are thereby extremely troublesome to handle since they usually must be stored and transported under water or some other protective medium. In view of the foregoing, the expense of employment of these white phosphorus smoke-generating compositions tends to be excessive.

Moreover, many prior art smoke-generating compositions (including white phosphorus) require oxygen to initiate and further support the reaction. Compositions which are initiated solely by heat are capable of producing more immediate and better smoke screens than those of the oxygen initiation type. These advantages are due to the greater availability of reaction surface in the heat initiated mixtures which makes possible a more uniform and complete overall reaction of the ingredients. Also, oxygen initiated smoke-generating mixtures have the further disadvantage of not being easily adaptable, as are heat initiated mixtures, to underwater applications.

SUMMARY OF THE INVENTION

Accordingly, one object of the instant invention is to provide a new and improved composition for generating smoke.

Another object of this invention is to provide new smoke-generating compositions which are inexpensive, safe, easily handled, and have improved storage stability properties.

It is a further object of this invention to provide new smoke-generating compositions which are heat initiated and do not require the support or inclusion of oxygen.

Still another object is to provide a new and improved method of producing smoke.

These and other objects are attained by providing a smoke-generating composition comprising zinc metal powder and Teflon (polytetrafluoroethylene) powder.

DESCRIPTION OF THE PREFERRED EMBODIMENTS

It has been found, surprisingly, that when zinc metal powder and Teflon powder are mixed and compacted in various optimum smoke producing amounts, preferably though within the range of 30–70 weight percent of zinc (of the total weight of zinc and Teflon) and 70–30 weight percent of Teflon (of the total weight of zinc and Teflon) and then heated to the initiation temperature of the mixture (usually about the melting point of the zinc) obscuring smoke and heat are produced. The initiating heat may be supplied by any conventional means. The zinc powder suitable for use in this composition may be of any particle size, preferably though within the range of about 325 to about 40 mesh. Any of the known or commercially available Teflon resins in powder form are suitable for use in the composition. For example, Du Pont's molding powder, Teflon Fluorocarbon Resin, Composition No. 5 (average particle size about 325 microns, sp. gr. 2.1–2.2) or Type 7A (sp. gr. 2.1–2.2) produce satisfactory results.

Additional pyrotechnic materials and modifiers may be included in basic zinc-Teflon system of the present invention for various optimum purposes, such as to enhance the physical properties of the components, to affect the initiation temperature of the reaction, to affect the maximum temperature of the reaction or to affect the maximum amount of smoke. Specifically, such metals as magnesium, aluminum, zirconium or titanium may be included up to about 15 percent by weight of the mixture to promote higher temperatures of reaction. From a practical and economic standpoint magnesium and aluminum are the preferred metals for this purpose. A typical composition including the magnesium would be a mixture containing 50 percent by weight zinc powder, 40 percent by weight Teflon powder and 10 percent by weight magnesium metal powder. Reaction temperatures in excess of 1000° C. are obtained using this mixture. Such high temperatures are desirable, for example, in incendiary type operations or where a high degree of light emissivity is a factor.

Other exothermic pyrotechnic mixtures may be added in various optimum proportions to the basic zinc-Teflon mixture. Such mixtures as Ni+Al or 3Mg+2Bi when added to the zinc-Teflon mixture are effective in changing the initiation temperature, the reaction rate, the maximum temperature of the reaction and amount of unreacted residue.

Thermite type additives like $Fe_2O_3+2Al$, $MoO_3+2Al$ or $2Nb+5CuO$ may also be added to the basic zinc-Teflon system in any optimum amounts to enhance the reaction. For example, a mixture composed of 2 parts of Ni+Al and 1 part of $Fe_2O_3+2Al$ added to the zinc-Teflon mixture accelerates the burning process.

Obviously, any of the commonly employed pyrotechnic ignition compositions, such as a boron and $KNO_3$ mixture, explosives, such as a carbon, sulfur and $KNO_3$ mixture and/or propellants may be added to the basic mixture to enhance burning and smoke-generating when these mixtures are used in pyrotechnical devices such for example as smoke-generating and incendiary grenades, warheads, bombs or the like.

All of these hereinbefore mentioned additives and modifiers are employed preferably in powder form and have average particle sizes of about 250 to 40 mesh.

The general nature of the invention having been set forth, the following examples are presented as specific illustrations thereof. It will be understood that the invention is not limited to these examples but is susceptible to different modifications that will be readily recognized by one of ordinary skill in the art. All percentages are by weight.

EXAMPLE I

Ingredients: Percent
- Zinc powder -------------------------------- 60
- Teflon (polytetrafluoroethylene) powder (sp. gr. 2.1–2.2) ---------------------------- 40

EXAMPLE II

Ingredients: Percent
- Zinc powder -------------------------------- 50
- Teflon (polytetrafluoroethylene) powder (sp. gr. 2.1–2.2) ---------------------------- 50

EXAMPLE III

Ingredients: Percent
- Zinc powder -------------------------------- 37
- Teflon (polytetrafluoroethylene) powder (sp. gr. 2.1–2.2) ---------------------------- 21
- 10% B+90% $KNO_3$ powder mixture -------- 25
- Magnesium powder ---------------------- 10
- $Fe_2O_3$ powder ---------------------------- 3.0
- Nickel powder ---------------------------- 2.0
- Aluminum powder ---------------------- 2.0

EXAMPLE IV

Ingredients: Percent
- Zinc powder -------------------------------- 50
- Teflon (polytetrafluoroethylene) powder (sp. gr. 2.1–2.2) ---------------------------- 25
- Magnesium powder ---------------------- 15
- $Fe_2O_3$ powder ---------------------------- 4
- Nickel powder ---------------------------- 3
- Aluminum powder ---------------------- 3

The compositions of Examples 1 to 4 were prepared by mechanically blending together and compacting in a standard powder compaction die the identified ingredients. Temperatures in the range of about 420–450° C. were necessary to initiate the smoke-generating reactions, however, once initiated the reactions were self-sustaining. Reaction temperatures of about 800–900° C. were obtained.

The composition of Example 3 was loaded in a grenade body and upon ignition yielded a dense dark greyish obscuring smoke with a fine floating particle residue.

The compositions of Examples 1, 2 and 4 were tested as smoke-pellets. Upon heating to the initiation temperature similar results as obtained in Example 3 were noted. Moreover, the compositions displayed no decomposition and excellent stability upon extended storage.

As will be evident to those skilled in the art, various modifications can be made in light of the foregoing disclosure without departing from the scope and spirit thereof.

What is claimed as new and desired to be secured by Letters Patent of the United States is:

1. A smoke generating composition consisting essentially of a mixture of zinc powder and polytetrafluoroethylene powder, and also containing a metal selected from the group consisting of magnesium, aluminum, zirconium and titanium and an exothermic pyrotechnic mixture selected from the group consisting of a mixture of nickel and aluminum in a 1:1 molar ratio, a mixture of magnesium and bismuth in a 3:2 molar ratio, a mixture of ferric oxide and aluminum in a 1:2 molar ratio, a mixture of molybdenum trioxide and aluminum in a 1:2 molar ratio, and a mixture of niobium and copper (II) oxide in a 2:5 molar ratio and mixtures thereof.

2. A smoke generating composition consisting essentially of a mixture of zinc powder and polytetrafluoroethylene powder and further comprising a mixture selected from the group consisting of boron and potassium nitrate and a mixture of carbon, sulfur and potassium nitrate.

3. A method for producing smoke comprising subjecting the composition of claim 2 to an elevated temperature sufficient to initiate the reaction of said composition.

4. A method for producing smoke comprising subjecting a composition consisting essentially of a mixture of zinc powder and polytetrafluoroethylene powder to an elevated temperature sufficient to initiate the reaction of said composition.

5. A method for producing smoke according to the method of claim 4 wherein the zinc powder comprises from about 30 to about 70 percent of the total weight of zinc powder and polytetrafluoroethylene powder and the polytetrafluoroethylene powder comprises from about 70 to 30 percent of the total weight of zinc powder and polytetrafluoroethylene powder.

6. A method for producing smoke comprising subjecting the composition of claim 1 to an elevated temperature sufficient to initiate the reaction of said composition.

References Cited

UNITED STATES PATENTS 3,198,678   8/1965   Zeman et al. _____ 149—44

OTHER REFERENCES

Gregory, Uses and Applications of Chemicals and Related Materials, vol. 1, Reinhold (1939), p. 642.

H. Bennett The Chemical Formulary, vol. III (1943) pp. 296, 297, D. Van Nostrand & Co.

JOHN D. WELSH, Primary Examiner

U.S. Cl. X.R.

260—41; 149—87, 19